United States Patent [19]

Wilde et al.

[11] Patent Number: 4,524,572
[45] Date of Patent: Jun. 25, 1985

[54] PICKLE HARVESTER

[76] Inventors: Bernard D. Wilde, 16920 Kenowa, Kent City, Mich. 49330; Gary R. Van Ee, 711 Sherwood, Williamston, Mich. 48895; Richard L. Ledebuhr, 6082 Pheasant.St.; C. Alan Rotz, 946 River Knoll, both of Haslett, Mich. 48840

[21] Appl. No.: 524,306

[22] Filed: Aug. 18, 1983

[51] Int. Cl.³ .............................................. A01D 45/00
[52] U.S. Cl. .................................. 56/327 R; 56/330; 130/30 R; 130/30 B; 171/28
[58] Field of Search ............................. 56/327 R, 330; 130/30 R, 30 B, 30 D, 30 P; 171/26, 27, 28

[56] References Cited

U.S. PATENT DOCUMENTS

| | | | |
|---|---|---|---|
| 3,536,140 | 10/1970 | Looker | 56/327 R |
| 3,600,882 | 8/1971 | Eisenberg | 56/327 R |
| 3,603,067 | 9/1971 | Wilde | 56/327 R |
| 3,916,913 | 11/1975 | Looker et al. | 56/327 R |

Primary Examiner—Gene Mancene
Assistant Examiner—David I. Tarnoff
Attorney, Agent, or Firm—John A. Waters

[57] ABSTRACT

A harvester for picking cucumbers that is effective and cost efficient on small, "pickling" cucumbers is mountable on a tractor frame for a conventional mechanical pickle harvester between a vine cutter and pinch roller mechanism. The harvester comprises a pickup mechanism at the front of the harvester for picking up severed cucumber vines and a conveying and fruit removal mechanism that conveys the vines rearwardly between the pick-up mechanism to the pinch roller mechanism, while at the same time gently dislodging fruit from the vines and thinning and defoliating the vines so as to improve the action of the pinch roller mechanism. The conveying and fruit removal mechanism includes a rotating paddle mechanism comprising cushioned gum rubber paddle blades that rotate in the direction of vine travel and strike the fruit as the vines are conveyed over the paddles. The number of paddles and position, spacing, speed, and synchronization of the paddles are carefully controlled such that the mechanism is small enough to fit in a frame for a conventional pickle harvester, is sufficiently light and flexible to use in a wide variety of field conditions, and is inexpensive and effective enough to provide an economically attractive alternative to hand harvesting or other conventional mechanical harvesters. A conveyor mechanism catches the pickles as they are separated from the vines and conveys the separated pickles to an elevating conveyor for storage.

19 Claims, 11 Drawing Figures

PICKLE HARVESTER

BACKGROUND OF THE INVENTION

1. Field of the Invention

The present invention relates to a harvester for pickling cucumbers ("pickles") and more particularly to an improved harvester that fits in a conventional tractor mounted running gear and employs rotating cushioned paddles along with pinch rollers for improving the yield of smaller fruit.

2. Description of the Prior Art

Conventional cucumber harvesting machines convey cucumbers and vines to counter-rotating pinch rollers, which draw the vines through the rollers but resist passage of fruit through the rollers. Such machines are relatively successful in separating larger pickles (sizes 3 and 4) from the vines. However, such machines have been less than satisfactory in separating a high percentage of small pickles (sizes 1 and 2) from the vines. This is particularly disadvantageous, because small pickles are quite desirable.

A principal object of the present invention is to provide an improved pickle harvester that can be mounted in the frame or running gear of a conventional tractor mounted harvester and economically improves the harvest of small as well as large cucumbers, with a high percentage yield and low amount of damage to the fruit.

SUMMARY OF THE INVENTION

In accordance with the present invention, an improved harvester attachment for picking cucumbers is mountable on a tractor frame for a conventional mechanical pickle harvester between the cutter and pinch roller mechanism. The attachment comprises a pick-up roller at the front of the harvester, the roller picking up pickle vines and feeding them to the harvester, and conveying means including a rotating paddle mechanism for conveying the pickles and vines rearwardly to the pinch roller mechanism. Each paddle comprises a rotating axle and a plurality of resilient, cushioned blades extending outwardly from the axle, the blades serving to convey the vines rearwardly as they pass over the blades while at the same time dislodging fruit from the vines by the rotating contact of the paddles. A conveyor mechanism catches the fruit as it is dislodged from the vines and conveys the fruit away from the harvesting mechanism to a storage location.

The vines are held down against the paddle means to improve the action of the paddles on the vines. Counter-rotating paddles positioned above the lower paddles, alone or in conjunction with a draper belt, are employed.

The paddle mechanism travels at a faster speed than the pick-up mechanism upstream from the paddle mechanism, so that the vines are thinned and stretched out longitudinally and laterally and oriented longitudinally by the paddle mechanism before entering the pinch rollers. This lets the pinch rollers remain closer together and is believed to thereby improve the yield of smaller pickles.

Desirably, the lower paddles are employed in a series of four or preferably five paddles. To accommodate an increased number of paddles in a conventional tractor-mounted running gear, the paddles are mounted in a curved path to define a curved vine pass line. With multiple paddles the speeds of the paddles are gradually increased in a downstream direction to further enhance the stretching out of the vines and the dislodging of fruit from the vines by the action of the paddles.

Various limits in the operation of the mechanism are very important to the effective operation of the mechanism. The adjacent paddles in a series are separated horizontally by no more than about one-half inch at their outer peripheries, and preferably by no more than one-fourth inch. The upper and lower paddles overlap by one to one and one-half inches. The upper and lower paddle blades are synchronized so that the upper and lower paddles are separated horizontally at the vine pass line by no more than about one inch. Other speed and operational features discussed herein also are important.

These and other advantages and features of the present invention will hereinafter appear. For purposes of illustration, but not of limitation, preferred embodiments of the present invention are described below and shown in the appended drawings.

DESCRIPTION OF THE PREFERRED EMBODIMENTS

Figure 1:
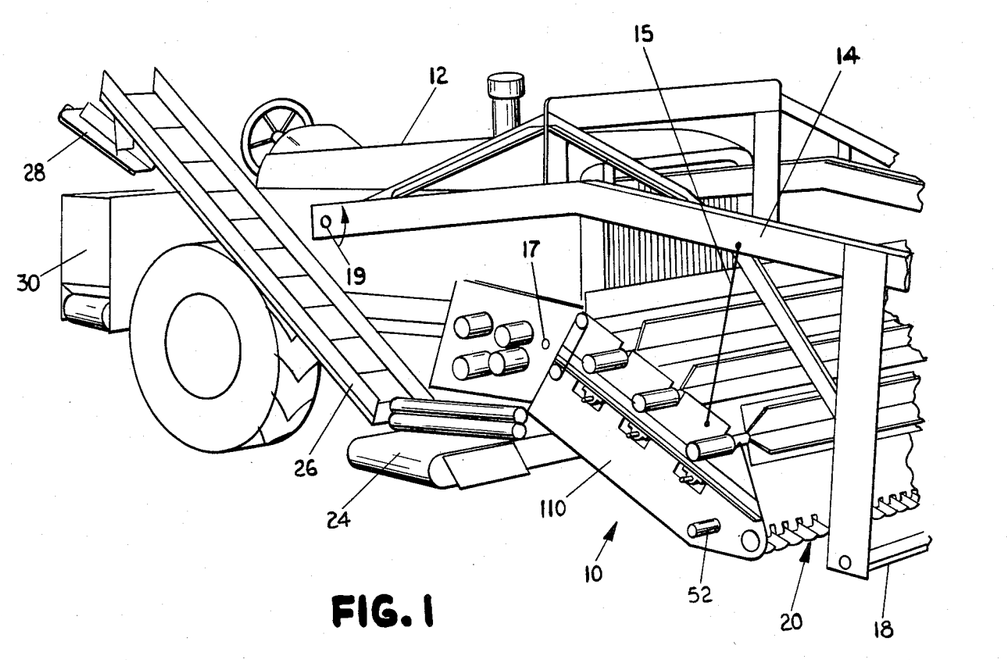
FIG. 1 is a perspective view of a pickle harvester constructed in accordance with the present invention mounted as an attachment on a tractor.

Referring to the drawings, a pickle harvester attachment 10 constructed in accordance with the present invention is shown mounted on a conventional tractor 12 in FIG. 1. Pickle harvester attachment 10 is suspended from a conventional pickle harvester frame 14 at the front end of the tractor. A cable 15 extending down from the front of the frame suspends the front end of the attachment. The rear end of the attachment is pivotally fastened at point 17 to the front end of the pinch roller mechanism. The rear end of frame 14 is pivotally attached to the tractor at point 19. The frame and attached pick-up mechanism can be pivoted upwardly at the front end to raise the pick-up attachment off the ground. A vine cutter 18 is positioned adjacent the ground in front of the harvester attachment, and a pickup roller 20 is positioned at the front of the harvester attachment for picking the vines up off the ground.

Figure 4:
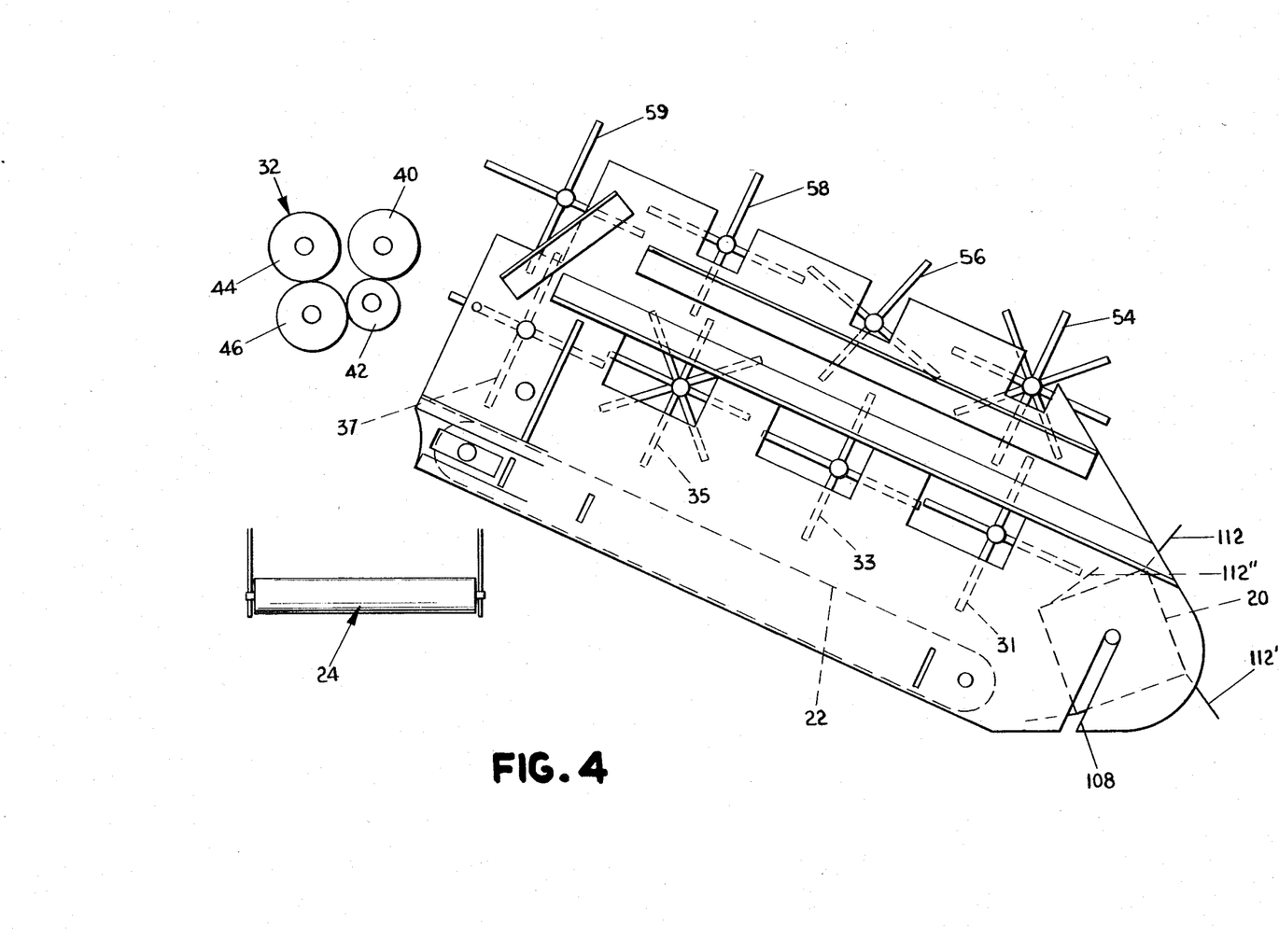
FIG. 4 is a right side elevational view of the pickle harvester attachment of FIGS. 1-3 with the hydraulic drive apparatus removed and showing the paddles in schematic form.

Referring to FIG. 4, a conveyor 22 is positioned on the underside of the pickle harvester attachment for conveying pickles rearwardly to a transversely mounted conveyor 24, mounted below the rear end of the harvester attachments. The transverse conveyor 24 carries the pickles to the side of the tractor. There the pickles are conveyed upwardly by means of an inclined conveyor 26 (FIG. 1). Pickles are discharged over the top of conveyor 26 over an upwardly moving debris removal conveyor 28 into a hopper 30 which is conveyed behind the tractor on a trailer or attached directly to the rear of the tractor. Except for the harvester attachment, the apparatus is used in conventional pickle harvesting.

Referring to FIG. 4, the pickle conveying and removing mechanism comprises four sets of upper paddles 54, 56, 58 and 59 and four sets of lower counter-rotating paddles 31, 33, 35 and 37. The upper and lower paddles are aligned in a straight line and extend rearwardly from pick-up roller 20 to a pinch roller mechanism 32. Six of the paddles are four-bladed and two are eight-bladed with the eight-bladed paddles 54 and 35 being positioned in the upper position at the first paddle assembly and at the lower position at the third paddle assembly counting rearwardly from the pick-up roller. Vines picked up by pick-up roller 20 are fed between the upper and lower paddles rearwardly to the pinch roller mechanism, with the upper paddles rotating in a clockwise direction and the lower paddles rotating in a counterclockwise direction (FIG. 4 orientation).

Pick-up roller mechanism 20 is conventional and includes a transverse central portion that rotates in a counterclockwise direction (FIG. 4 orientation), with four rows of outwardly extending pick-up tines or fingers 112 spaced around the central portion. The fingers extend outwardly to the position of fingers 112' (FIG. 4) when picking up vines but then pivot downwardly to the position of finger 112" (FIG. 4) when the fingers pass the paddles.

The spacing between the paddle blades and the rate of rotation of the paddles is an important feature of the present invention. The rotation of the upper and lower paddles are synchronized so that each time a blade of one paddle passes the vine pass line a blade of the other paddle follows immediately behind. Desirably, the blades of the lower paddles lead their respective upper paddle blades slightly. The lower paddle blade should be no more than about one (1) inch and preferably no more than about one-half ($\frac{1}{2}$) inch ahead of the upper paddle blade when engaging the vines. Also the upper and lower paddles should overlap by about one to one and one-half inches in a vertical direction. Outside the range, the paddles can slip on the vines or damage the fruit excessively.

It is also important that successive paddles in a row are positioned close to one another so that the tips of the paddles just miss each other as the paddles rotate. Desirably this spacing is about 0 to $\frac{1}{2}$ inches and ideally no more than about $\frac{1}{4}$ inch.

The spacing of the paddles is important in order to effectively convey the vines through the paddles. If the upper and lower paddles do not overlap, the upper blades do not press down adequately on the vines in order to keep them efficiently held pinched between the paddles. The spacing of the paddle blades in each respective upper or lower row is important in order to prevent vines from wrapping around the paddles instead of being conveyed directly through the paddles. When the adjacent paddles in a successive row are spaced no more than one-half ($\frac{1}{2}$) inch apart, the counter-rotating blades pass near each other and strip vines away from any paddles that they may be clinging to. Thus blade 58' in FIG. 4 is in position to strip the vine away from blade 56' as blade 58' travels in a downward direction and blade 56' travels in an upward direction.

The speed of the respective sets of upper and lower paddles is an important feature of the present invention. In the present invention the speed of each successive set of paddles increases from the upstream to the downstream direction. The increase in speed causes the paddles to stretch out the vines in a longitudinal direction between the successive sets of paddles and also in a lateral direction. The vines are then thinner when fed through the pinch rollers and this enhances the pinching action of the rollers. Also, with the increase in speed in successive paddles the vines are held in place by the upstream paddles and are gently struck by the downstream paddles. This enhances the removal of pickles from the vines and it also serves to defoliate the vines, which further increases the effectiveness of the pinch rollers. In the described embodiment, the tractor operates at a ground speed of about one and one-half ($1\frac{1}{2}$) miles per hour, which is about the minimum for an economical operation, and the roller speeds are synchronized to this speed. A somewhat slower speed, perhaps as low as one MPH., might be barely tolerable for a field with a very dense crop (e.g. 600 bushels per acre), but for a normal field, the pick-up mechanism and slowest paddles operate at a surface speed about equal to ground speed which is about 50 RPM for a ground speed of one and one-half ($1\frac{1}{2}$) miles per hour. The second set of paddles are operated at about twice the speed of the first set (about 100 RPM); and the third set of paddles are operated at about twice the speed of the second set (about 200 RPM); and the fourth set of paddles are operated at a speed of about 350–400 RPM. The pinch rollers are operated at a faster surface speed than the pick-up mechanism but need not operate at as fast a surface speed as the last set of paddles, since the upstream paddles tend to hold the vines back somewhat. A pinch roller speed of 600 RPM for the lower front three inch roller is satisfactory.

With this apparatus, vines are fed through and stripped efficiently of smaller as well as larger cucumbers.

The pinch roller mechanism 32 is of conventional design and comprises two (2) pair of counter-rotating rollers, with the forward set comprising an upper roller 40 about $4\frac{1}{2}$ inches in diameter and a lower roller 42 about 3 inches in diameter, and the rearward set comprising an upper roller 44 and a lower roller 46, both about $4\frac{1}{2}$ inches in diameter. The upper roller in each set is mounted in a track and is movable toward and away from the lower rollers. The upper roller is resiliently biased toward the lower roller such that the rollers are resiliently urged apart by the passage of cucumber vines through the rollers. The outlet of the paddle mechanism is positioned very carefully so that the vines are fed directly into the forward set of rollers 40 and 42 from the adjacent set of paddles. Importantly, the pinch rollers are about six inches from the rear end of the paddles and are positioned so that the stretched out vines engage roller 40 just below its center line, thus causing the vines to be directed into the space between rollers 40 and 42. The pickles on the vines are pinched from the rollers and are prevented from passing through the rollers by the close spacing of the rollers. The pickles then drop downwardly into a conveyor and are conveyed away from the pickle harvesting apparatus.

Figure 2:
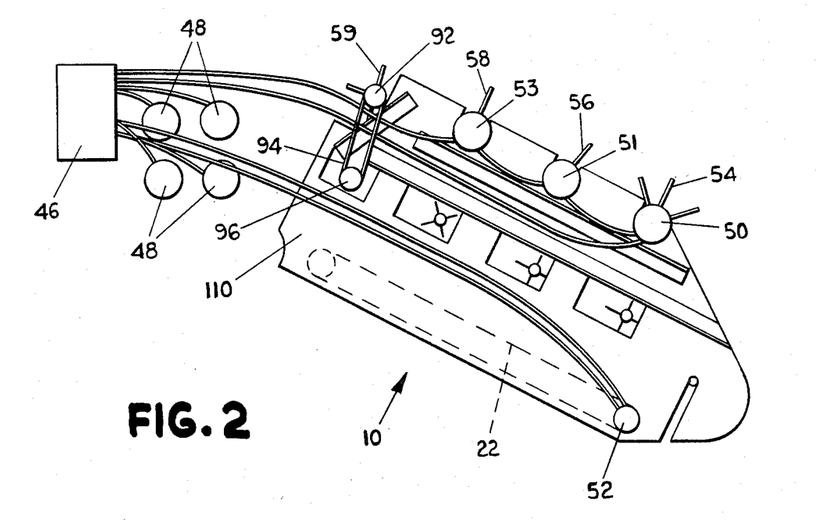
FIG. 2 is a right side elevational view of the pickle harvester attachment of FIG. 1, showing the hydraulic drive mechanism for rotating the paddles.
Figure 3:
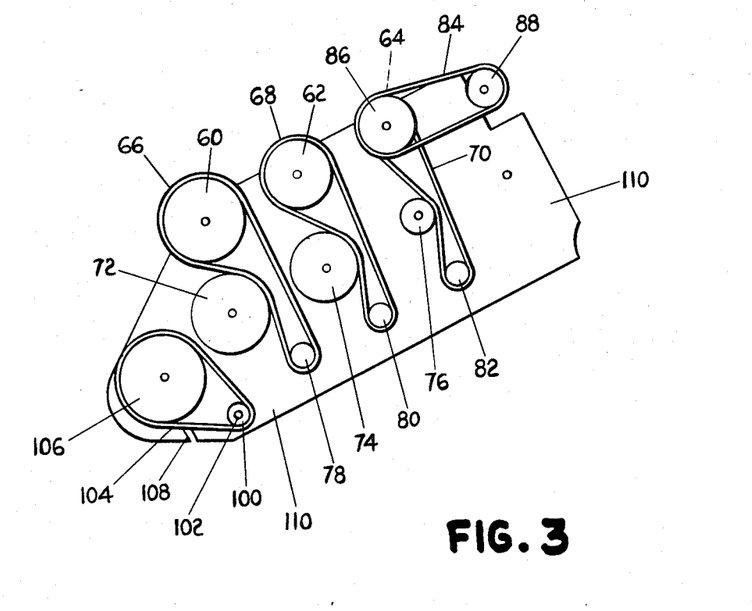
FIG. 3 is an elevational view from the opposite side of the pickle harvester attachment of FIG. 2, showing the manner in which other paddles and rollers are slave driven by a chain mechanism.

One type of hydraulic drive mechanism for rotating the rollers and paddles is shown in FIGS. 2 and 3. As shown in FIG. 2, pressurized hydraulic fluid is pumped from a source 46 (shown schematically) through suitable hoses to hydraulic motors that drive the pinch rollers and paddles. Four hydraulic motors 48 drive the pinch rollers and three hydraulic motors 50, 51 and 53 drive paddles 54, 56 and 58, respectively. Another hydraulic motor 52 operates the pick-up roller and a conveyor 61 that extends rearwardly under the paddle mechanism.

As shown in FIG. 3, lower paddles 31, 33 and 35 are slave driven by upper paddles 54, 56 and 58 through a chain and sprocket drive. Sprockets 60, 62 and 64 are attached at the outer ends of the axles for paddles 54, 56 and 58 respectively. These sprockets drive chains 66, 68 and 70, which in turn rotate sprockets 72, 74 and 76 for respective lower paddle mechanisms in a direction opposite to the direction of rotation of the upper paddles. Tension in the chains is maintained by lower sprockets 78, 80 and 82 positioned at the lower portion of the harvester attachment. A separate chain drive 84 interconnects a separate sprocket 86 on the axle for paddle 58 for purposes of rotating rear paddle mechanism 59 by means of sprocket 88. Lower paddle 37 is slave driven by a separate drive 9 positioned on the opposite side of the attachment from the chain drives shown in FIG. 3. As shown in FIG. 2, a drive sprocket or pulley 92 mounted on the axle of paddle 54 drives by means of drive mechanism 94 a pulley or sprocket 96 on the axle of paddle 37.

Pick-up roller 12 is driven by a sprocket 100 on the end of drive shaft 102 for conveyor 61 (which is powered by motor 52) by means of a chain drive 104 and a sprocket 106 mounted on the end of the pick-up roller axle (see FIG. 3). The pick-up roller is mounted in a vertical slot 108 in a side frame 110 of the harvester attachment. This permits removal of the pick-up roller for maintenance purposes.

The construction of the paddles is an important feature of the present invention, and this construction is shown in FIGS. 7-11. The paddle blades 111 are cushioned so that the fruit is not damaged by contact with the blades. Preferably, the blades are formed of a soft resilient material such as gum rubber and extend the full width of the harvester attachment. The soft gum rubber paddle blades resiliently engage the fruit and the vines in order to transport the vines rearwardly through the picking apparatus, while at the same time gently striking and dislodging the fruit from the vines as they pass over and under the paddles. Desirably the paddle blades are formed of gum rubber having a thickness of about $\frac{3}{8}$ to $\frac{5}{8}$ inch, preferably $\frac{1}{2}$ inch. The paddle blades are about 4 inches long in a radial direction and are about 76 inches wide for a typical tractor attachment. The paddle blades can have the straight configuration shown in FIG. 7 or the edges can be serrated as shown in blade 113 in FIG. 8.

Figure 9:
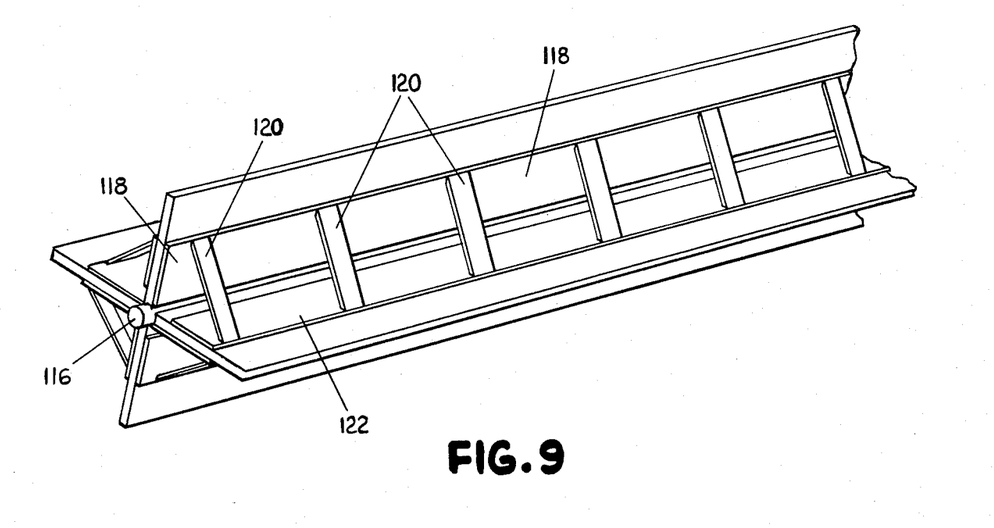
FIG. 9 is a perspective view showing a four-bladed paddle mechanism constructed in accordance with the present invention.
Figure 10:
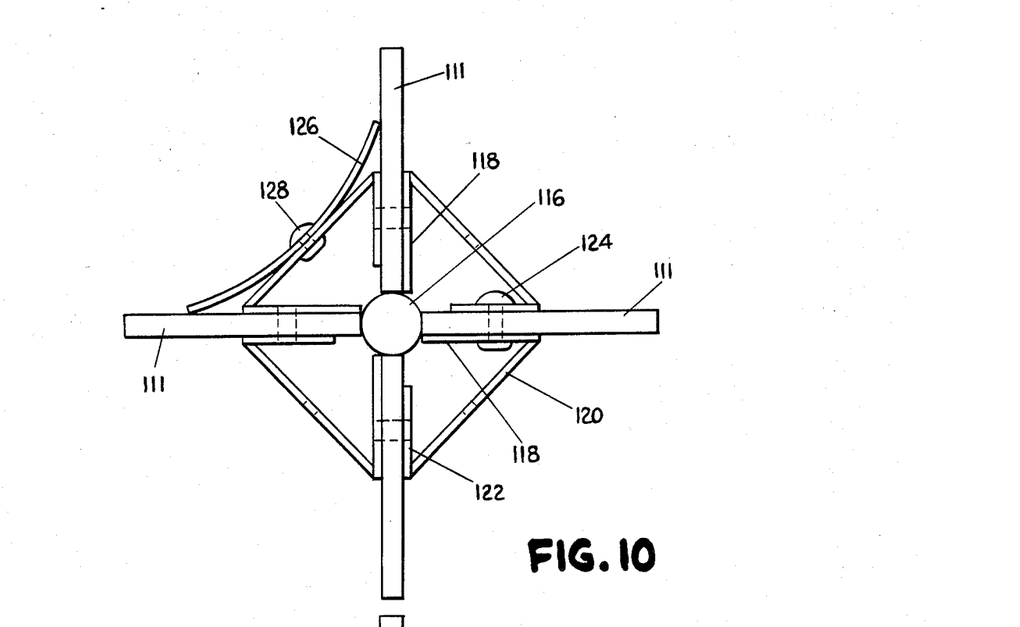
FIG. 10 is an end view of the paddle mechanism of FIG. 9.
Figure 11:
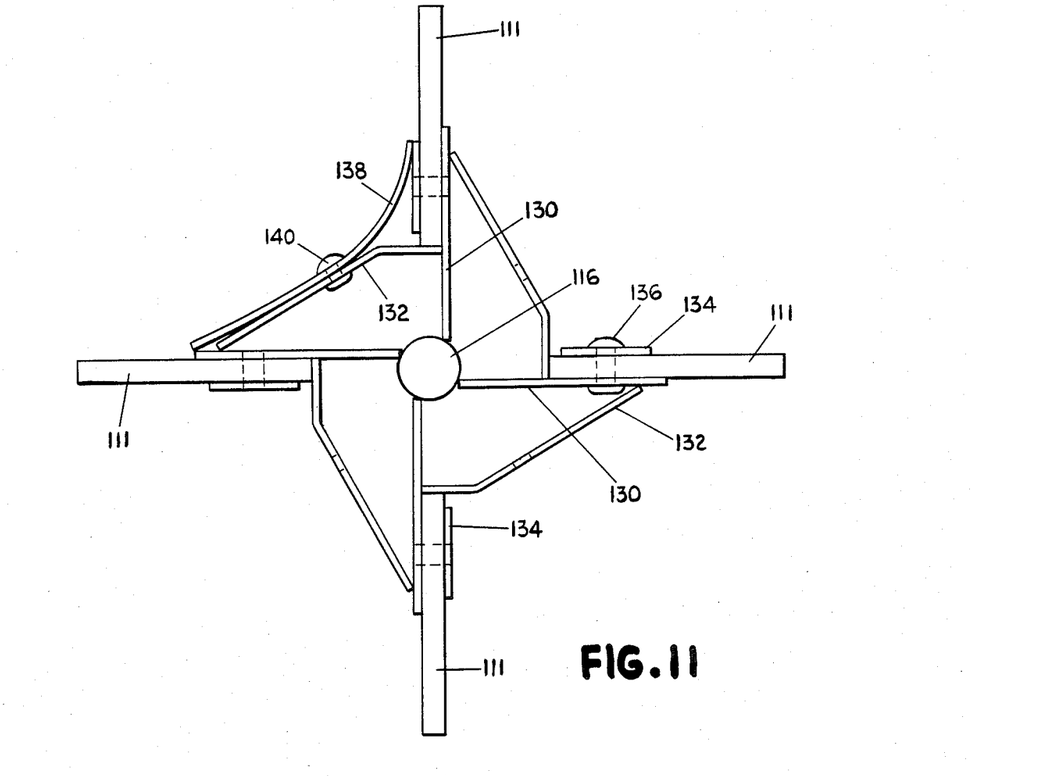
FIG. 11 is an end view of a second embodiment of a paddle construction in accordance with the present invention.

The paddle blades are mounted in a paddle frame assembly in the manner shown in FIGS. 9-11. As shown in FIGS. 9 and 10 the paddle frame assembly comprises an internal axle 116 that runs transversely between the frame members of the harvester mechanism and is rotatably mounted therein. Four radially disposed mounting plates 118 are attached at equally spaced intervals around the axle and extend outwardly therefrom. Angular mounting flanges 120 are attached at spaced intervals along plates 118. Separate mounting plates 122 are positioned on the opposite side of each blade and are attached at their outer ends to flanges 120. With this construction, mounting plates 120 and 122 are positioned on opposite sides of each paddle blade and run the entire length of the paddle blade so as to provide continuous support for the gum rubber blade. The blades are fastened to the flanges by means of bolts or other suitable threaded fasteners 124 (shown schematically in one location only in FIG. 10).

In order to protect the fruit against damage when contacting metal support mechanism for the gum rubber blades, a strip of vinyl sheet 126 (shown schematically on one side of the paddle only for illustrative purposes in FIG. 10) is attached by threaded fasteners 128 or the like which extend through openings in brackets 120 so as to extend the full length of the paddle assembly and cover all the metal parts. This cushions the fruits and vines and prevents them from becoming injured by contact with the metal parts. While the vinyl protective sheeting is shown in only one of the paddles of FIG. 10, it is understood that it is affixed to all four sides of the paddle assembly.

Another embodiment of a paddle blade mounting mechanism is shown in FIG. 11. In this construction, longitudinal mounting plates 130 similar to plates 118 are mounted at spaced intervals about the axle and extend outwardly therefrom. Flanges 132 having a bend therein extend from an outer portion of each plate to the plate 130 immediately adjacent thereto. The bend in the bracket provides a perpendicular connection with the next adjacent plate. Paddle blades 111 fit against the perpendicular portion of brackets 132 and the side of mounting plates 130, with a corresponding mounting plate 134 being positioned on the opposite side of the blade. Threaded fasteners 136 pass through mating openings in the mounting plates and in the rubber blades in order to hold the blades securely to the mounting plates. A vinyl protective sheet 138 (shown schematically on only one side of the paddle in FIG. 11) covers the metal mounting mechanism of the apparatus and prevents damage to the fruit and prevents the fruit and vines from becoming entangled with the mounting mechanism. Vinyl sheet 138 is fastened to the mounting brackets through openings therein by threaded fasteners 140 or the like.

Paddles of this general construction are employed in all embodiments of the invention described herein, with the exception that various paddles have different numbers of blades.

Figure 5:
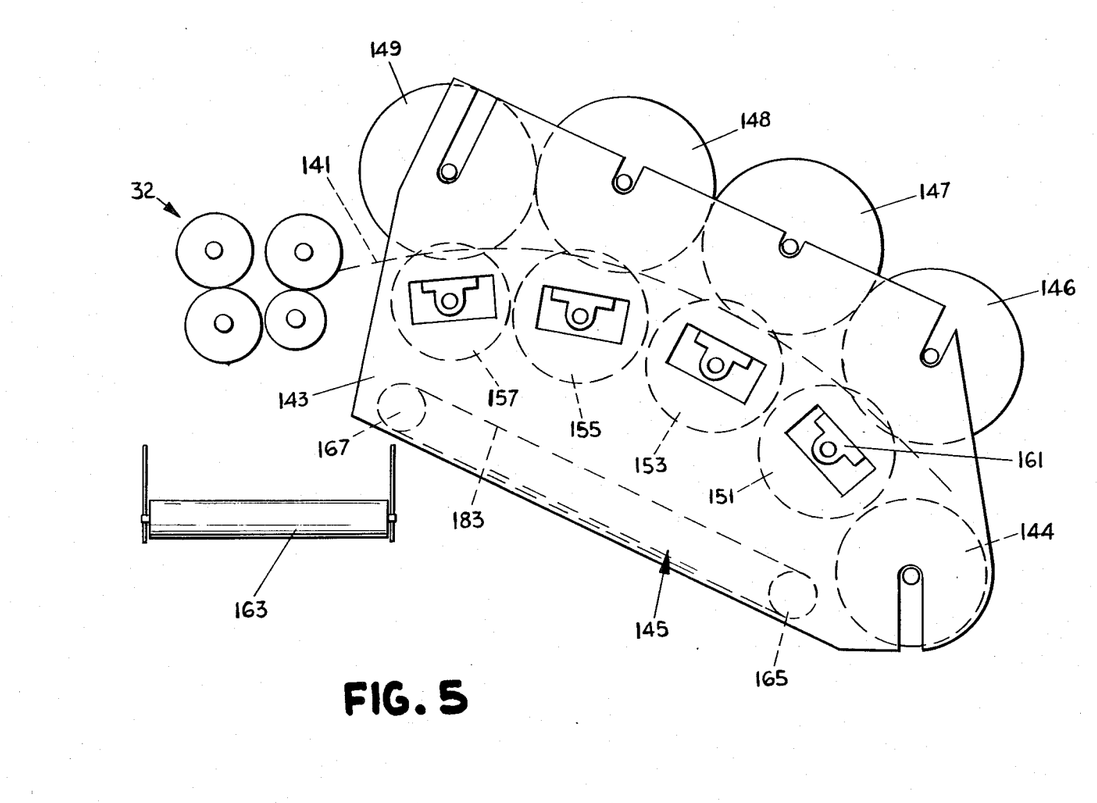
FIG. 5 is a schematic right side elevational view of a second embodiment of a pickle harvester mechanism.

An improved embodiment of the invention is shown in FIG. 5. This apparatus is similar to the apparatus of FIG. 4, with the exception that the paddle mechanism defines a non-linear, curved vine pass line 141. One purpose for the curved pass line is that it makes the length of the attachment shorter, and this in turn permits a series of four paddle assemblies to be mounted more easily in an existing frame for a pickle harvester attachment. The pickle harvester of FIG. 4 can be more difficult to mount in a conventional pickle harvester frame mechanism (which is a frame for a Wilde harvester or its approximate equivalent). The shorter assembly also can be lighter and more easy to use in a soft field.

As shown in FIG. 5, harvester attachment 142 comprises a pair of side plates 143, with four upper and four lower paddles, a pickup roller 144 and a lower longitudinal conveyor 145 mounted between the side plates. Each of the paddles is a four-bladed paddle. Upper paddles 146, 147, 148 and 149 are mounted in downwardly extending slots in the side plates, while pickup roller 144 is mounted in upwardly extending slots in the side plates. Each of the upper paddles is desirably about twelve inches in diameter, with the spacing between adjacent upper paddles being 0-$\frac{1}{2}$ inch and preferably $\frac{1}{4}$ inch. Lower paddles 151, 153, 155 and 157 extend through openings 159 in the side plates and are rotatably secured in place by pillow block bearings 161 which are fastened to flanges attached to the side plates. The same type of bearing mounting is employed for the upper paddles as well (not shown). The lower paddles also are four-bladed paddles separated by about 0-$\frac{1}{2}$ inch and preferably about $\frac{1}{4}$ inch. Paddles 151, 153 and 155 desirably are nine inches in diameter, while paddle 157 desirably is eight inches in diameter. The lower paddles overlap their respective upper paddles by about one to one and one-half (1-1$\frac{1}{2}$) inches.

Conveyor 145 is positioned below the paddle assembly and is adapted to convey pickles rearwardly to a transverse conveyor 183 which is mounted below pinch roller mechanism 32, which is the same as the pinch roller mechanism discussed previously. Conveyor 145 comprises an endless belt 163 mounted between rollers 165 and 167, with roller 165 being powered. Desirably roller 165 is about four inches in diameter and is positioned as close to the ground and as close to being under the pickup roller as possible in order to minimize the number of pickles that are lost by falling between the front end of the conveyor and the pickup roller. The size and position of the roller 165 is significant in reducing pickle loss with the present invention. Roller 167 of the conveyor can also be about four inches in diameter.

The positioning of the harvester attachment with respect to the pinch roller mechanism is important. Desirably, the pinch roller mechanism is positioned about six inches away from the rear end of the paddle mechanism at an elevation such that the vines engage the upper, forward roller just below the center line. This maximizes the efficiency with which vines are conveyed to the pinch roller mechanism from the paddle mechanism.

Desired rotation speeds of the various components are as follows, with the rotation speeds being indicated in revolutions per minute based on a ground speed of 1$\frac{1}{2}$ MPH:

| COMPONENT | RPM |
| --- | --- |
| Pickup Roller | 50 |
| First Roller | 50 |
| Second Roller | 100 |
| Third Rollers | 200 |
| Fourth Rollers | 350–450 |
| Pinch Rollers | 600 (3 inch Roller) |

Figure 6:
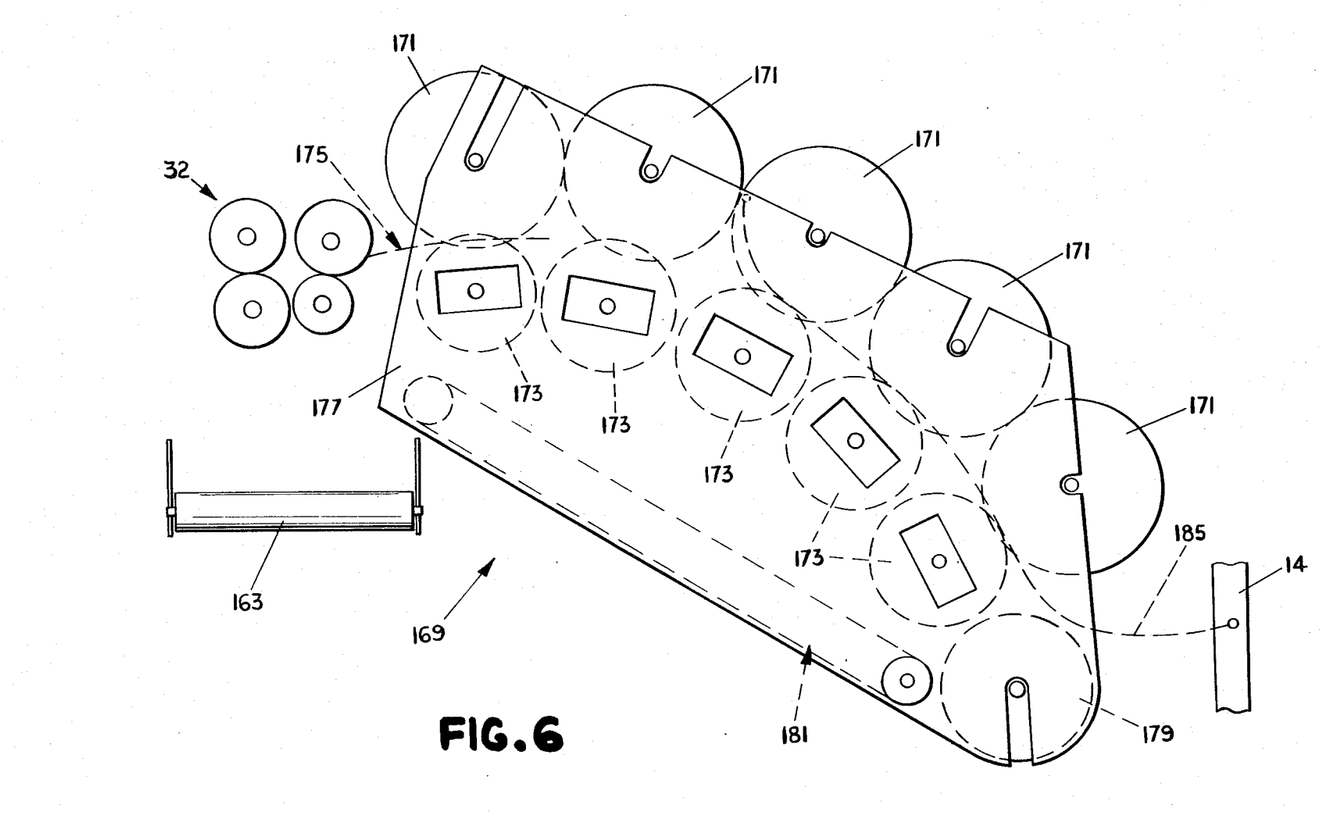
FIG. 6 is a schematic right side elevational view of a third embodiment of the pickle harvester mechanism of the present invention.
Figure 7:
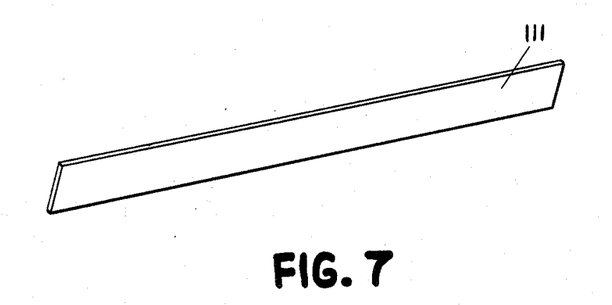
FIG. 7 is a perspective view showing one of the gum rubber paddle blades employed in the pickle harvester mechanism of the present invention.
Figure 8:
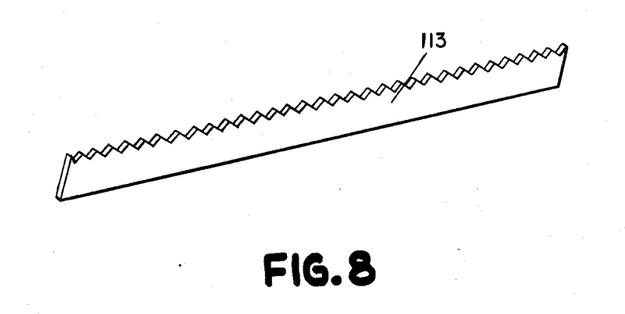
FIG. 8 is a perspective view of a gum rubber paddle mechanism employing serrated outer edges.

As shown in FIG. 6, a further improved pickup attachment 169 comprises five upper paddles 171 and five lower paddles 173 defining a curved pass line 175 as employed in FIG. 5. The paddles are mounted between side plates 177 as in FIG. 5. The rollers are of the same general configuration as the rollers of FIG. 5. The pickup roller 179 also is the same as pickup roller 144. A conveyor 181 of substantially the same design and position as conveyor 145 is positioned below the paddle assembly and as close to the pickup roller as possible. The same transverse conveyor 163 and pinch roller mechanism 32 is employed, and the spacing between the rear end of the pickup attachment and the pinch roller mechanism is the same as in FIG. 5. A small guide roller 183 having short metal blades is positioned between the paddle assembly and pinch rollers to assist in directing the vines into the pinch rollers.

The additional set of paddles in FIG. 6 enhances the removal of pickles by the striking action of the paddles and stretching out of the vines by the rotation of the paddles at progressively increasing speeds. Desired rotation speeds of the various components are as follows for a typical value of tractor engine speed (with ground speed being about one and one-half miles per hour):

| COMPONENT | RPM |
| --- | --- |
| Tractor engine speed | 1800 |
| Pickup Roller | 70 |
| First Rollers | 90 |
| Second Rollers | 80 |
| Third Rollers | 110 |
| Fourth Rollers | 280 |
| Fifth Rollers | 400 |
| Pinch Rollers (3 inch) | 600 |

To reduce the cost and weight of the above mechanism, two or three (preferably two) of the upstream upper paddles can be removed and a draper belt 185 (shown in phantom) used in place thereof. The draper belt is preferably formed of one-eighth inch nylon reinforced polyurethane belt. The belt is pivotably suspended between the sidewalls 77 of the attachment frame by means of a rectangular frame 187. Frame 187 comprises side rails 189 pivotally attached to the sidewalls at pivot point 191 and cross members 193 at each end of the frame. The draper belt is attached and suspended from the cross members. The downward pivotal movement of the frame is limited by stop members 195 on the sidewalls, which engage the side rails. Draper belt 185 lays on the first two paddles, just missing the teeth of the pick-up. The draper belt (shown as element 185') also can replace the first three upper rollers to further reduce weight.

The importance of the draper belt is twofold. First, it reduces cost without an appreciable reduction in effectiveness, which makes the attachment more economically viable as an alternative to hand harvesting of conventional mechanized harvesting. Also, it reduces weight, so that the attachment can be used in a wide variety of field conditions. A heavy attachment can essentially sink in a soft or wet field and be rendered inoperative.

It should be recognized that the foregoing is merely illustrative of the present invention and that various changes and modifications may be made in the design and construction of these embodiments without departing from the spirit and scope of the present invention.

The embodiments of the invention in which an exclusive property or privilege is claimed are defined as follows:

1. A harvester attachment especially effective for small cucumbers that is mountable in a frame for a conventional tractor mounted cucumber harvester between the vine cutter and pinch roller mechanism thereof, the attachment comprising a pick-up mechanism that picks up the vines and a conveying and pickle removing means for conveying vines from the pick-up to the pinch roller mechanism and for dislodging pickles from the vines, the conveying and pickle removing means including upper and lower rotating paddle means rotating in the direction of vine movement between the pick-up mechanism and pinch roller mechanism, the paddle means having cushioned blades that convey the vines and strike the cucumbers so as to dislodge them from the vines, the paddles being spaced and synchronized such that the vines are held between the upper and lower paddle means while cucumbers are dislodged from the vines by the rotating paddles, without excessive vine slipping or fruit damage, the harvester including drive means for operating at least a portion of the paddle means at a vine contacting surface speed that is faster than the vine contacting surface speed of the mechanism upstream from said portion of the paddle means such that vines are stretched out and struck by the blades of said portion of the paddle means, the harvester attachment further comprising conveyor means for conveying dislodged cucumbers from the harvester to a storage location.

2. A harvester attachment according to claim 1 wherein the individual blades are formed of gum rubber and are mounted for rotation in a rigid rotating paddle frame assembly.

3. A harvester attachment according to claim 2 wherein the paddle mechanism further comprises cushioning means attached to the rigid paddle frame assembly for minimizing damage to pickles contacted by the paddle frame assembly.

4. A harvester attachment according to claim 2 wherein the gum rubber paddle blades are about $\frac{3}{8}$ to $\frac{5}{8}$ inches thick.

5. A harvester attachment according to claim 4 wherein the gum rubber paddle blades are about $\frac{1}{2}$ inch thick and about 4 inches long in a generally radial direction.

6. A harvester attachment according to claim 1 wherein the upper and lower paddle means comprise paddle mechanisms, each having a plurality of transversely oriented blades, with the rotation speeds of the paddles being synchronized such that successive blades of the lower paddle contact the vines in closely spaced timing to successive blades of the upper paddle mechanism positioned thereabove, with the blades of one paddle mechanism trailing the respective blades of the other paddle mechanism by 0-1 inch when the blades pass by the vine pass line.

7. A harvester attachment according to claim 6 wherein the blades of the upper paddle trail the respective blades of the lower paddle by about $\frac{1}{2}$ inch when the blades pass by the vine pass line.

8. A harvester attachment according to claim 6 wherein the blades of the upper and lower paddle mechanisms overlap by about one to one and one half ($1-1\frac{1}{2}$) inches at the vine pass line.

9. A harvester attachment according to claim 1 wherein the paddle means comprises a plurality of lower paddles arranged in a row below the vines, and upper means positioned above the lower paddles to hold the vines down on the paddles, the upper means comprising counter-rotating upper paddles positioned above at least some of the lower paddles, the drive means operating the paddles in a downstream direction at increasing vine contacting surface speeds, such that the paddles tend to stretch out and thereby thin and orient the vines as they travel through the paddles, while at the same time striking and dislodging cucumbers from the vines.

10. A harvester attachment according to claim 9 wherein the paddle means comprises at least four (4) sets of upper and lower paddles.

11. A harvester attachment according to claim 10 wherein the paddles are arranged in a non-linear path such that the vines follow a non-linear pass line through the harvester between the pick-up roller to the pinch roller mechanism, the path being such that the length of the harvester between the pick-up roller through the end of the rearmost roller is sufficiently short to insert the improved harvester in an unmodified support frame for a conventional harvester in place of a conventional pick-up roller and conveyor mechanism having no rotating paddles.

12. A harvester attachment according to claim 9 wherein the paddle means includes five (5) sets of lower paddles, with the paddles being arranged in a non-linear pass line.

13. A harvester attachment according to claim 10 wherein the upper means comprises upper paddles positioned opposite a downstream portion of at least two lower paddles and a draper belt positioned above an upstream portion comprising at least two upper paddles, the draper belt comprising a flexible belt that rides on the upper surface of the opposing lower paddles.

14. A harvester attachment according to claim 9 wherein the successive paddles in each row are spaced closely enough together to prevent the vines from wrapping around the paddles as they are conveyed through the harvester, the successive paddles being spaced apart such that the arcs formed by the outer surfaces of the rotating paddles are separated by about $0-\frac{1}{2}$ inches.

15. A harvester attachment according to claim 14 wherein the arcs formed by the outer surfaces of rotating adjacent paddles in each row are separated by no more than about $\frac{1}{4}$ inch.

16. A harvester attachment according to claim 9 wherein the rear-most lower paddle is about six (6) inches from the pinch roller mechanism and is positioned to direct the vines such that they are effectively engaged by the counter-rotating rollers in the pinch roller mechanism.

17. A pickle harvester attachment for a conventional tractor-mounted running gear that includes a support frame, a vine cutter, a pinch roller mechanism, and a main conveyor for collecting and transferring pickles to a storage bin, said pickle harvester attachment being an integral unit mountable in the frame so as to pick up vines behind the cutter and convey them to the pinch roller mechanism, conveying at the same time separated pickles to the main conveyor, said pickle harvester attachment comprising:
a housing adapted to be mounted on the tractor support frame;
pick-up roller means mounted in the front of the housing for picking up vines off the ground;
a plurality of sets of opposed upper and lower counter-rotating paddles mounted in the housing so as to define a vine pass line from the pick-up roller means to the pinch roller means, each of said paddles including a plurality of transverse gum rubber blades mounted in the housing for rotation about a transverse axis, the upper and lower paddles in each set being connected for synchronized rotation such that as each blade of the lower paddle passes the top of its arc, a blade of the upper paddle trails said lower paddle blade by a distance of up to ½ inch, the successive upper paddles and the successive lower paddles in each row being separated at the arc of their outer surfaces by 0–½ inches, the paddles being positioned to receive vines from the pick-up roller and convey the vines to the pinch roller mechanism; and drive means for operating the pick-up roller means, the paddles, and the pinch roller mechanism, the drive means operating the paddles at vine contacting surface speeds that increase in the downstream direction, at least some paddles exceeding the speed of the vine contacting surface of the pick-up rollers, such that the paddles tend to stretch out and thin the vines as they are conveyed, the paddles urging the pickles to become dislodged from the vines and enhancing the effectiveness of the pinch roller mechanism, the vine contacting surface speed of the pinch roller mechanism exceeding the vine contacting surface speed of the paddles.

18. A pickle harvester attachment for a tractor-mounted running gear that includes a support frame, a vine cutter, a pinch roller mechanism, and a main conveyor for collecting and transferring pickles to a storage bin, said pickle harvester attachment being an integral unit mountable in the frame so as to pick up vines behind the cutter and convey them to the pinch roller mechanism, conveying them to the pinch roller mechanism, conveying at the same time separated pickles to the main conveyor, said pickle harvester attachment comprising:

a housing adapted to be mounted on a tractor support frame;

pick-up roller means mounted in the front of the housing for picking up vines off the ground;

a plurality of lower counter-rotating paddles mounted in the housing, the upper surfaces of which define a vine pass line from the pick-up roller means to the pinch roller means, each of said paddles including a plurality of transverse gum rubber blades mounted in the housing for rotating about a transverse axis, the lower paddles being separated at their outer periferies by about 0–½ inches;

upper means positioned above the lower paddles for holding the vines down against the lower paddles, the upper means comprising upper counter-rotating paddles positioned above a downstream portion of the lower paddles and a draper belt positioned above an upstream portion of the lower paddles, the rotation of the upper paddles being synchronized with the rotation of the opposed lower paddles such that as each blade of the lower paddle passes the top of its arc, a blade of the upper paddle is separated horizontally from said lower paddle blade by a distance of up to ½ inch and overlaps the lower paddle blade by 1–1½ inches, the successive upper paddles and the successive lower paddles in each row being separated at the arc of their outer surfaces by 0–½ inches, the paddles being positioned to receive vines from the pick-up roller and convey the vines to the pinch roller mechanism; and drive means for operating the pick-up roller means, the paddles, and the pinch roller mechanism, the drive means operating the paddles at vine contacting surface speeds that increase in the downstream direction, at least some paddles exceeding the speed of the vine contacting surface of the pick-up rollers, such that the paddles tend to stretch out and thin the vines as they are conveyed, the paddles urging the pickles to become dislodged from the vines and enhancing the effectiveness of the pinch roller mechanism, the vine contacting surface speed of the pinch roller mechanism exceeding the vine contacting surface speed of the paddles.

19. In a harvester for pickles or the like adapted to be mounted on a powered vehicle, wherein the harvester comprises cutter means for cutting vines, a pick-up mechanism that picks vines off the ground, a pinch roller mechanism through which the vines are subsequently conveyed for the purpose of separating the pickles from the vines, a conveying mechanism that conveys the pickles from the pick-up mechanism to the pinch roller mechanism, and a collection mechanism that collects pickles that are separated from the vines, the improvement wherein the conveying mechanism comprises a rotating resilient paddle mechanism interposed between the pick-up mechanism and pinch roller mechanism, the paddle mechanism conveying the vines over the paddle mechanism at least part of the way between the pick-up mechanism and the pinch roller mechanism so as to enhance separation of the pickles from the vines, the paddle mechanism comprising opposed upper and lower counter-rotating paddles mounted in the housing so as to engage and convey vines at least part of the way between the pick-up roller means and the pinch roller means while at the same time striking and dislodging fruit from the vines, each of said paddles including a plurality of transverse gum rubber blades mounted for rotation about a transverse axis, the upper and lower paddles being connected for synchronized rotation such that as each blade of the lower paddle passes the vine pass line a blade of the upper paddle is separated from said lower paddle blade by a distance of up to ½ inch, the upper and lower paddle blades overlapping by about 1–1½ inches at the vine pass line, the harvester further including drive means for operating the pick-up roller means, the paddles, and the pinch roller mechanism, the drive means operating the paddles at vine contacting surface speeds that increase in the downstream direction relative to the pick-up rollers, such that the paddles tend to stretchen out and thin the vines as well as dislodge pickles from the vines, thereby enhancing the effectiveness of the pinch roller mechanism.

* * * * *